April 30, 1929.    P. R. YUNKER    1,710,851

BATTERY AND GENERATOR CONTROL

Filed July 12, 1924

Inventor

*Prosper R. Yunker.*

By *Mason Fenwick & Lawrence.*
    Attorneys

Patented Apr. 30, 1929.

1,710,851

UNITED STATES PATENT OFFICE.

PROSPER R. YUNKER, OF HELENA, MONTANA, ASSIGNOR TO GLENN C. HENRY, OF HELENA, MONTANA.

BATTERY AND GENERATOR CONTROL.

Application filed July 12, 1924. Serial No. 725,637.

This invention relates to an improved battery and generator control, and more particularly to a control system which will connect the generator of an automobile to the storage battery when the voltage of the same drops an appreciable amount, and which will automatically disconnect the said generator and battery when the battery is fully charged.

An object of the invention is to provide a highly efficient generator and battery control system which will automatically connect or disconnect an automobile generator with the storage battery when the said battery is respectively undercharged or fully charged, thereby eliminating the possibility of overcharging the battery and burning out the lights of the automobile.

A further object of the invention is to provide an automatically controlled generator and battery system which will positively connect or disconnect the generator with the storage battery when the same is partially exhausted or fully charged, and to further provide means for varying the necessary voltage for operating the system.

Other objects will appear as the description proceeds.

In the accompanying drawings which constitute a part of my application,

The single figure is a diagrammatic view of the control system and electrical hook-up for the same.

My improved generator and battery control system may be quickly and readily applied to any make of automobile and for clearness and understanding of its operation, I have only represented the essential apparatus and hook-up diagrammatically. The starting motor 1 is grounded at 2, and is also connected through the starter switch 3, to the storage battery 4, which in turn is also grounded at 5. The terminal 6 of the switch 3 is connected to one side of an ammeter 7, the opposite side of which is connected through the circuit breaker 8 to the brush 9 of the generator 10, and also to the lever 11 of the control switch 12.

A voltmeter 13 has one of its sides grounded at 14, while its opposite side is connected to the "on" terminal 15 of the switch 12. The terminal 15 also is connected to one terminal of the primary 16 of the induction coil. The other terminal of the primary 16 is connected through a resistance 17, and through the breaker points 18 of the distributor and grounded at 19. A condenser 20 is shunted across the points 18 to prevent arcing and heating of the same.

The secondary 21 of the induction coil is connected to the top cap 22 of the distributor and through the electric cables or conductors 23 to the spark plugs in the engine.

The terminal 15 of the switch 12 is also connected to the contact 24 and to the winding of the magnet 25 which is provided with an adjustable set screw 27, which is used to vary the distance between the magnet and the armature 28. A contact 29 is carried by the armature 28, and is normally spaced from the contact 24. The armature 28 is connected through the electromagnet 30, which in turn is grounded to 31. A condenser 32 is shunted across the contacts 24 and 29 to prevent arcing between the same and consequent pitting of the points.

A second magnet 33 is positioned a short distance away from the magnet 30 and in alignment therewith and is grounded at 34, and is also connected to a spring contact 35. A second spring contact 36 is positioned adjacent the contact 35 and is connected to the "off" contact 37 on the control switch 12.

A second brush 38 on the generator 10 is grounded at 39, while the third brush 40 of the generator is connected to a spring contact 41 directly opposite the spring contact 36. The field 42 of the generator 10 is connected between the first brush 9 thereof and a spring contact 43 which overlies the contact 41 and is directly opposite the contact 35.

A pivoted armature 44 is disposed between the magnets 30 and 33 and is adapted to be attracted by the same. A rod 45 is carried at the lower end of the armature 44 and has insulated portions 46 and 47 at its opposite ends, exteriorly of which are positioned the pointed contacts 48 and 49, which are adapted to be interposed respectively between the spring contacts 41 and 43 and 36 and 35.

From the drawing it will be seen that the pointed contact 48 is positioned between the spring conacts 41 and 43 in such a manner that the field 42 of the generator is shunted between the brushes 9 and 40 while the insulated portion 47 at the right hand end of the rod 45 is positioned between the spring contacts 35 and 36 so that there is no circuit between the same.

An angled finger 50 is carried adjacent the lower end of the armature 44 and serves to aid in withdrawing the armature 28 from the magnet 25.

The mode of operation of my improved system is as follows: When an automobile engine is not running the several parts of the apparatus will be in the position as illustrated in the single view of the drawing, and the switch arm 11 of the control switch 12 will be on the "off" contact 37. The starter switch 3 is depressed and the electricity from the battery will cause the starting motor 1 to operate, thereby starting the engine. As soon as the engine is started the shunted field circuit will be closed since the spring contacts 41 and 43 are connected through the pointed contact 48. As the automobile proceeds and the engine keeps running, the electricity passes through the magnet 25 and through the ground 26. The magnet 25 is formed of a large number of turns of small wire. The more nearly charged the battery gets the higher the pressure or voltage becomes in the magnet 25, and finally when the battery is completely charged the magnet 25 will draw the armature 28 toward it until the contacts 24 and 29 touch, at which time the current will flow through the magnet 30 and through the ground 31, thereby energizing the said magnet 30, which consequently attracts the armature 44 towards it and forces the insulated portion 46 of the bar or rod 45 between the spring contacts 41 and 43, thereby breaking the field circuit of the generator. At the same time the pointed contact 49 rests between the spring contacts 35 and 36 so that the current may flow through the same when the control switch is turned off. The generator therefore stops charging the battery since the field thereof is no longer shunted across the generator. The magnets 30 and 33 are formed with a few turns of large size wire so that a small amount of current will readily operate the same. The finger 50 secured to the armature 44 will retain the armature 28 away from the magnet 25 and will consequently hold the contacts 24 and 29 separated and thus deenergize magnet 30 after the same has attracted armature 34.

When stopping the engine the control switch is turned so that the switch arm 11 contacts with the "off" contact 37 and current from the battery will consequently pass through the magnet 33 and cause the same to be energized and draw the armature 44 back into the position illustrated in the drawings, at which time the field of the generator will again be shunted across the same.

If the battery was fully charged when the engine was again started it would run but a very short time before the magnet 25 would again be energized and allow the contacts 24 and 29 to touch, thereby permitting the current to energize the magnet 30 to break the circuit of the shunted field which would thereby prevent the generator from further charging the storage battery.

This apparatus has been thoroughly tested out and it is found that if the engine is started and the battery is considerably drained and the engine is not allowed to run long enough to fully recharge the battery, the apparatus will not shut off, but if the engine is run long enough to fully recharge the battery the apparatus will positively shut off every time.

It is understood that this system may readily be applied to any make of automobile using any ignition system, and only minute changes will have to be made.

Many minor changes in detail of construction may be resorted to without departure from the spirit of the invention.

I claim:

In a generator and battery control system, the combination with a storage battery and a shunt field generator charging the battery having a field winding connected between generator brushes, of a reciprocable contact bar having an insulating portion and a conducting portion at each end, means for reciprocating said bar including a solenoid, resilient contacts at each end of said bar arranged for engagement with the corresponding insulated and conducting portions, connected one in series circuit with the shunt field and the other in series circuit with the solenoid, and so disposed that, when the bar is at one end of its movement, one of said circuits is broken by the corresponding insulated portion while the other is closed, and conversely, when the bar is at the other end of its movement.

In testimony whereof I affix my signature.

PROSPER R. YUNKER.